United States Patent [19]
Lucas

[11] Patent Number: 5,555,352
[45] Date of Patent: Sep. 10, 1996

[54] OBJECT-BASED IRREGULAR-GRID VOLUME RENDERING

[75] Inventor: Bruce D. Lucas, Yorktown Heights, N.Y.

[73] Assignee: International Business Machines Corporation, Armonk, N.Y.

[21] Appl. No.: 263,816

[22] Filed: Jun. 22, 1994

Related U.S. Application Data

[63] Continuation-in-part of Ser. No. 156,873, Nov. 23, 1993, which is a continuation of Ser. No. 690,034, Apr. 23, 1991, abandoned.

[51] Int. Cl.$^6$ .................................................. G06T 15/50
[52] U.S. Cl. .......................................... 395/123; 395/126
[58] Field of Search .................................. 395/119, 123, 395/124, 126, 129, 131, 132

[56] References Cited

U.S. PATENT DOCUMENTS

| | | | |
|---|---|---|---|
| 4,685,070 | 8/1987 | Flinchbaugh | 395/124 |
| 4,719,585 | 1/1988 | Cline et al. | 395/124 |
| 4,729,098 | 3/1988 | Cline et al. | 364/413.18 |
| 4,821,210 | 4/1989 | Rumbaugh | 395/121 |
| 4,827,413 | 5/1989 | Baldwin et al. | 364/413.19 |
| 4,835,688 | 5/1989 | Kimura | 364/413.22 |
| 4,835,712 | 5/1989 | Drebin et al. | 395/123 |
| 4,866,612 | 9/1989 | Takagi et al. | 364/413.22 |
| 4,918,625 | 4/1990 | Yan | 395/131 |
| 4,924,414 | 5/1990 | Ueda | 364/522 |
| 5,113,490 | 5/1992 | Winget | 395/119 |
| 5,150,457 | 9/1992 | Behm et al. | 395/126 X |

OTHER PUBLICATIONS

Foley et al., "Computer Graphics Principles and Practice", Secind edition, Addison-Wesley Publishing Company, 1990, pp. 754–756.

"Chem–Ray: A Molecular Graphics Program Featuring an Umbra and Penumbra Shadowing Routine" b J. Lauher, J. Mol. Graphics, vol. 8, Mar. 1990.

Computer Graphics, vol. 16, No. 3, Jul., 1982—"A More Flexible Image Generation Environment" by F. C. Crow, pp. 9–18.

"Processing Requirements for Hidden Surface Elimination and Realistic Shading", Turner Whitted, Bell Laboratories pp. 245–250.

8222 IEEE Computer Graphics and Applications 9(1989) Jul., No. 4, Los Alamitos, CA. "Transparency And Antialiasing Algorithms Implemented With The Virtual Pixel Maps Technique" pp. 43–55.

*Primary Examiner*—Mark K. Zimmerman
*Attorney, Agent, or Firm*—Perman & Green

[57] ABSTRACT

Method and apparatus for rendering data for display. The data represents a model space and the method includes the following steps. A first step associates individual points in the model space with individual vertices (V) of an irregular grid cell enclosed by faces. Each of the points has an associated luminosity value and an associated opacity value. A next step orders the faces of the grid cells. The faces are preferably ordered by depth referenced to a view plane. A further step processes individual faces for determining, for all viewing rays that project from pixels on the view plane and that intersect the face being processed, an amount of light arriving at the pixel. The amount of light arriving at the pixel is a function of both the luminosity and the opacity of a grid cell that lies adjacent to the face and through which the viewing ray passes.

16 Claims, 3 Drawing Sheets

FIG. 3
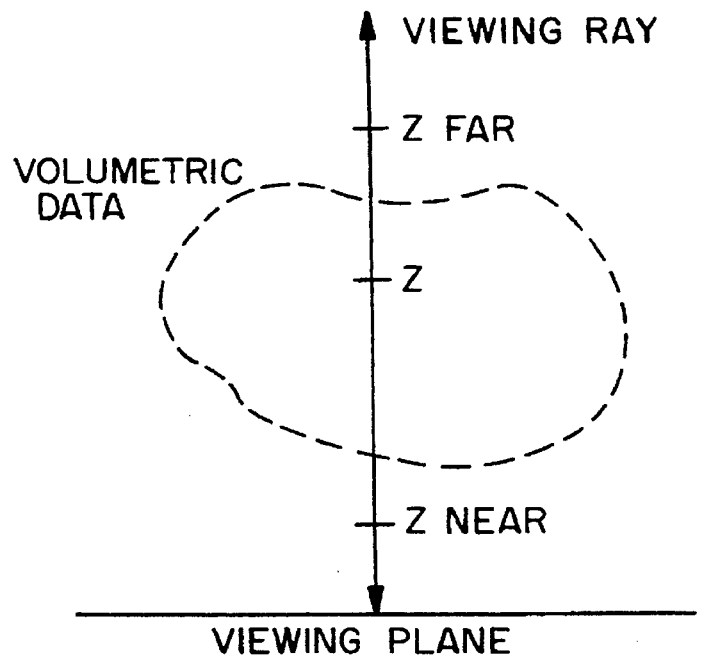
FIG. 4
FIG. 5
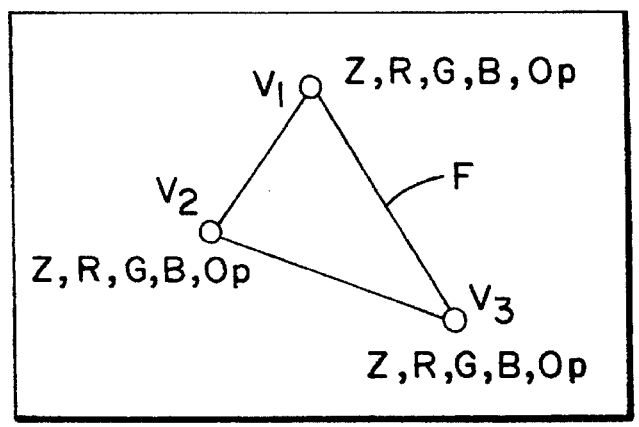

OBJECT-BASED IRREGULAR-GRID VOLUME RENDERING

CROSS-REFERENCE TO A RELATED PATENT APPLICATION

This patent application is a continuation-in-part of U.S. patent application Ser. No. 08/156,873, filed Nov. 23, 1993, which is a continuation of U.S. patent application Ser. No. 07/690,034, filed Apr. 23, 1991 (abandoned).

FIELD OF THE INVENTION

This invention relates generally to image display apparatus and method and, in particular, to an object-based method and apparatus for rendering volumetric data that is represented within an irregular grid.

BACKGROUND OF THE INVENTION

Volume rendering is a known technique for visualizing three-dimensional space-filling, or volumetric, data. In general, volume rendering assigns to each point within the volume of data an opacity and a luminosity. The opacity and luminosity are assigned as some function of the data value at that point. Subsequently, there is produced an image of the resulting imaginary solid translucent object. By proper choices of colors, opacities, and viewing directions a visualization and, hence, an understanding of the data may be obtained.

Traditionally, most applications have operated with data sampled onto a uniform or regular grid, such as medical computerized tomography images. Volume rendering of regular grids is readily accomplished by compositing successive layers of volume elements, or voxels, to obtain an image. However, many scientific simulations are accomplished with irregular grids, in which the volume of interest is divided into a space-filling mesh of cells where the data values are computed only at the vertices where the cells meet. Data values within a cell are interpolated from the data values at the vertices of the cell. As one example, and as illustrated in FIG. 9, an irregular grid comprised of cells 1 may be employed for modelling airflow over a curved surface of an aircraft wing 2. The grid is made irregular by conforming the grid to the surface under study. Of course, this is but one example of an irregular grid structure.

The relatively simple compositing method does not apply to rendering such irregular grid data because the thickness of each cell, as viewed from each pixel at the image plane, must be taken into account in forming the image. Rendering such irregular-grid volume data currently requires either resampling the data on a regular grid or using a ray tracing technique.

Unfortunately, neither of these conventional approaches provides an optimum rendering solution. Resampling and rendering the data onto a regular grid typically greatly increases the number of data points to be processed. Ray tracing is also a computationally expensive technique in which imaginary viewing rays are projected out from the image plane. The luminosity and opacity are computed at each cell, taking cell thickness into account, and are then integrated along each ray.

The following U.S. patents are cited for showing conventional regular grid volume rendering systems.

U.S. Pat. No. 4,866,612, issued Sep. 12, 1989, entitled "Imaging System Including Means to Provide A Display Image with Shadows and Three Dimensional Perspectives by a Combination of Voxel and Surface Method" to Takagi et al. relates to displaying surfaces derived from a volumetric regular grid.

U.S. Pat. No. 4,827,413, issued May 2, 1989, entitled "Modified Back-To-Front Three Dimensional Reconstruction Algorithm" to Baldwin et al. describes a method for displaying opaque solids defined by a volumetric regular grid.

U.S. Pat. No. 4,719,585, issued Jan. 12, 1988, entitled "Dividing Cubes System and Method for the Display of Surface Structures Contained within the Interior Region of a Solid Body" to Cline et al. renders a surface defined by a threshold value on a regular volumetric (parellelopiped) grid.

U.S. Pat. No. 4,835,688, issued May 30, 1989, entitled "Three-Dimensional Image Processing Apparatus" to Kimura renders a surface defined by a threshold value on a regular volumetric grid.

U.S. Pat. No. 4,821,210 issued Apr. 11, 1989, entitled "Fast Display of Three-Dimensional Images" to Rumbaugh extracts a surface in the form of a set of triangles directly from volume elements. Specific mention is made of extracting polygonal surfaces from cubes.

U.S. Pat. No. 4,729,098, issued Mar. 1, 1988, entitled "System and Method Employing Nonlinear Interpolation for the Display of Surface Structures Contained Within the Interior Region of a Solid Body" to Cline et al. extracts a surface in the form of a set of triangles directly from the volume elements. This patent also considers only regular grids and has disclosure directed to extracting polygonal surfaces.

An article entitled "Chem-Ray: A Molecular Graphics Program Featuring an Umbra and Penumbra shadowing Routine" by J. W. Lauher, J. Mol. Graphics, 1990, Vol. 8, March pp. 34–38 uses a ray tracing technique to render shadowed molecular graphics models.

Also of interest in this area is U.S. Pat. No. 4,835,712, issued May 30, 1989, entitled "Methods and Apparatus for Imaging Volume Data with Shading" to Drebin et al. This patent describes a method of assigning material opacities to volume elements so as to make boundaries within volumetric data visible. Drebin's teaching makes mention of storing data in arrays of voxels, implying regular grids. Drebin et al. describe a method for computing opacities and luminosities at each point in the volumetric data, but do not specify how the resulting opacities and luminosities are to be rendered for display.

What is not taught by this prior art, and what is thus an object of the invention to provide, is method and apparatus for rendering volumetric data defined at sample points on an irregular grid, such as a mesh of tetrahedra, deformed rectangles, or other non-rectangular volume elements.

It is a further object of the invention to provide an object-based, as opposed to a ray-based, method and apparatus for rendering volumetric data defined at sample points on an irregular grid.

A further object of the invention is to provide an efficient method and apparatus for rendering volumetric data as if the data represented a solid in space having a specific opacity and luminosity at each point, as opposed to only rendering surfaces derived from volumetric data or to rendering the volumetric data as if it were an opaque solid.

SUMMARY OF THE INVENTION

The foregoing and other problems are overcome and the objects of the invention are realized by an object-based method and apparatus for volume rendering three-dimensional data defined on an irregular grid, such as scientific or engineering simulation results. In accordance with the invention there is provided a rendering technique in which each face, or border between grid cells, is considered in turn. The visual effect of a cell that lies in front of or in back of the considered face is added to the image. This technique provides a significant speed advantage over the conventional techniques of resampling and ray tracing.

In accordance with a method of the invention, and apparatus for accomplishing the method, there is described a method of rendering data, representing a model space, for display. The method includes the following steps. A first step associates individual points in the model space with individual vertices of an irregular grid cell enclosed by faces. Each of the points has an associated luminosity value and an associated opacity value. A next step orders the faces of the grid cells. The faces are preferably ordered by depth referenced to a view plane. A further step processes individual faces for determining, for all viewing rays that project from pixels on the view plane and that intersect the face being processed, an amount of light arriving at the pixel. The amount of light arriving at the pixel is a function of both the luminosity and the opacity of a grid cell that lies adjacent to the face and through which the viewing ray passes.

The step of associating includes a step of determining an x, y and z coordinate of the point relative to the view plane and also includes a step of expressing the luminosity in terms of a plurality of colors.

The step of processing may be accomplished by processing the ordered faces in order of increasing depth from the view plane or in order of decreasing depth from the view plane.

BRIEF DESCRIPTION OF THE DRAWING

The above set forth and other features of the invention are made more apparent in the ensuing Detailed Description of the Invention when read in conjunction with the attached Drawing, wherein:

FIG. 3 shows in greater detail the organization of a face list that is also maintained in the memory of the system of FIG. 1;

FIG. 4 depicts a viewing ray, a viewing plane, and their relationship to volumetric data to be rendered;

FIG. 5 depicts a face of a tetrahedral grid cell having vertices V1, V2, and V3;

DETAILED DESCRIPTION OF THE INVENTION

Figure 1:
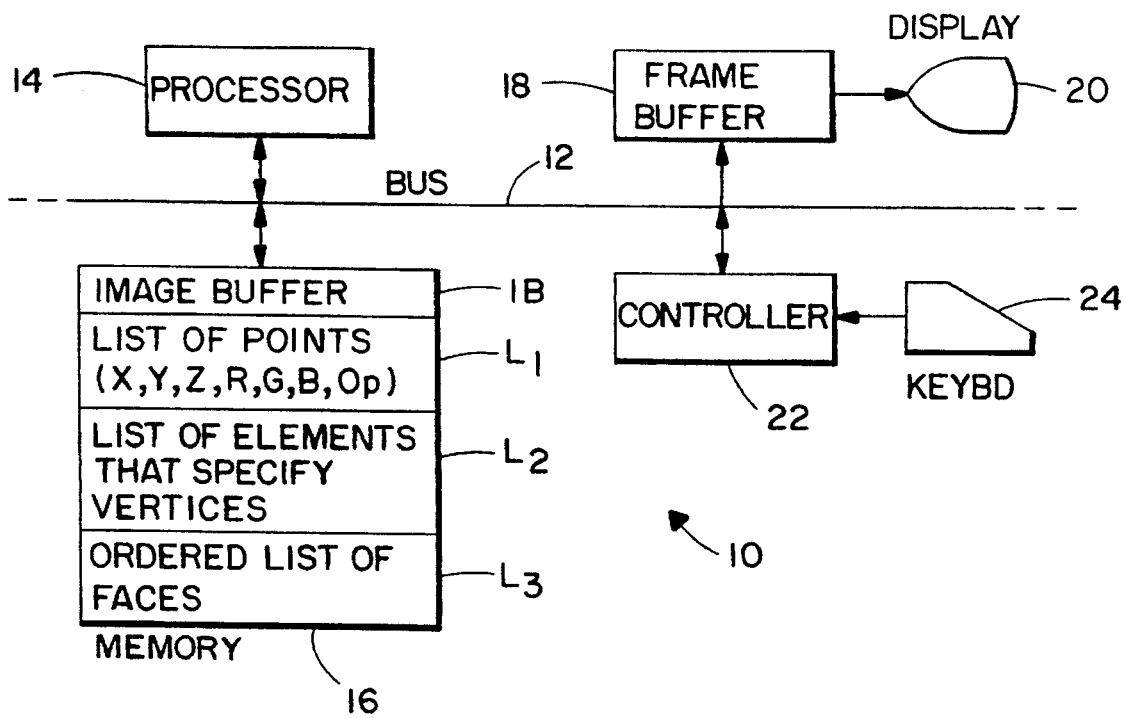
FIG. 1 is a simplified block diagram of a graphics rendering system constructed and operated in accordance with the invention.

Referring first to FIG. 1 there is depicted a rendering system 10 that is constructed and operated in accordance with the invention. System 10 includes a digital bus 12 that couples together a data processor 14, a memory 16, a frame buffer 18 that is coupled to a display means 20, and a display controller 22 having a user entry device, such as a keyboard 24. Preferably the display 20 is a high resolution color graphics display. The processor 14 processes volumetric data that is proved thereto to create a displayable image in an image buffer (IB). The contents of IB are moved across the bus 12 to the frame buffer 18 for display. In accordance with the invention the volumetric data provided to the processor 14 is referenced to an array of irregular, non-rectangular grid cells. By example, the grid cells may be tetrahedral, rectangular, or of any three dimensional polyhedral shape selected for representing the underlying volumetric data to be rendered and visualized. To this end the processor 14 employs a first input list (L1) of points or vertices of the grid cells, a second input list (L2) of elements that specify the vertices of the grid cells, and a third internally generated list (L3) of ordered faces of the irregular grid cells.

As employed herein it is assumed that a solid to be rendered has defined at each point a luminosity, expressed as quantity of light emitted per unit of material, and an opacity (or optical density), expressed as a proportion of light absorbed per distance travelled. The opacity is generally an intrinsic property of the material, related in some way to the volumetric data. The luminosity may be intrinsic, that is derived from the volumetric data; or extrinsic, that is due to external lighting or internal shadows or scattering.

Before continuing a further discussion of the system shown in FIG. 1 a description will first be provided of the underlying mathematical relationships implemented by the system in rendering volumetric data.

Referring briefly to FIG. 4 an amount of light arriving at any point in a viewing plane is determined by integrating the contributions from each point along a viewing ray between a near point $z_N$ and a far point $z_F$. If $L(z)$ and $D(z)$ represent the luminosity and opacity, respectively, at a point z along the ray; the light emitted from each point z on the ray toward the viewing plane is attenuated by passage through the material from the point z on the ray to the point $z_N$. The amount of this attenuation is given by the transparency T:

$$T(z_N, z) \stackrel{def}{=} \exp\left(-\int_{z_N}^{z} D(\zeta)d\zeta\right). \qquad (1)$$

It should be noted that while $D(z)$ indicates the proportion of light absorbed per distance travelled at the point z; $T(z_N,z)$ indicates the proportion of light transmitted in travelling from z to $z_N$. To a first approximation, $$T(z,z+\Delta z) \approx 1 - D(z)\Delta z. \qquad (2)$$

The total amount of light arriving at the viewing plane is given by integrating the light $L(z)dz$ emitted at each point z, attenuated by the transparency $T(z_N, z)$ from z to $z_N$. In general, the amount of light emitted toward the viewing plane by a segment of a viewing ray from $z_N$ to $z_F$, or the brightness of that segment, is given by the integral $$B(z_N, z_F) \stackrel{def}{=} \int_{z_N}^{z_F} L(z)T(z_N, z)dz = \int_{z_N}^{z_F} L(z)\exp\left(-\int_{z_N}^{z} D(\zeta)d\zeta\right)dz. \qquad (3)$$

T and B can be shown to exhibit simple but useful properties. A first property is that the total transparency of two adjacent segments is the product of their transparencies:

$$T(a,c)=T(a,b)T(b,c), \text{ where } a \leq b \leq c. \qquad (4)$$

A second useful property is that the brightness of a segment may be computed from the brightness of two sub-segments according to:

$$B(a,c) = B(a,b) + T(a,b)B(b,c), \quad (5)$$

where $a \leq b \leq c$.

By applying the properties of T and B from equations 4 and 5 the brightness (B) can be rewritten in terms of the transparencies and brightnesses of each of the segments $(z_i, z_{i+1})$ as:

$$B(z_0, z_n) = \sum_{i=0}^{n-1} B_i \prod_{j=0}^{i-1} T_j. \quad (6)$$

Computing B is accomplished by: enumerating the intersections between the viewing rays, originating at each viewing plane pixel, and the faces; at each intersection interpolating to obtain the luminosity and opacity; for each segment, approximating $B_i$ and $T_i$; and accumulating the light for each viewing ray according to the sum in equation (6).

In accordance with an aspect of the invention this calculation of B is carried out most efficiently by an object-based technique that enumerates faces in front-to-back or back-to-front order, and for each face enumerating that face's intersection with viewing rays.

Let $\lambda$ denote the accumulated light for any given pixel. For front-to-back order, it is also necessary to accumulate $\tau$, the total transparency of the segments processed thus far. These variables are initialized as:

$$\lambda \leftarrow 0, \text{ and}$$

$$\tau \leftarrow 1.$$

It should be noted that in the case of a color display there is provided a separate $\lambda$, and a separate $\tau$ if the material absorbs colors selectively, for each of primary display colors red, green, and blue (RGB).

For each segment $(z_i, z_{i+1})$ there is computed an estimate $\tilde{B}_i$ for $B_i$ and an estimate $\tilde{t}_i$ for $t_i$ in accordance with:

$\Delta z_i \leftarrow z_i + 1 - z_i$;

$D_i \leftarrow$ linear interpolation between vertices ($D_i$ is D of $Z_i$); and $L_i \leftarrow$ linear interpolation between vertices ($L_i$ is L of $Z_i$);

$\bar{d}_i \leftarrow \frac{1}{2} \times (D_{i+1} + D_i) \times \Delta z_i$;

$\bar{l}_i \leftarrow \frac{1}{2} \times (L_{i+1} + L_i) \times \Delta z_i$;

where $\bar{d}_i$ and $\bar{l}_i$ are approximations to the L and D contributions for the $i^{th}$ cell and are computed by averaging the opacity and luminosity, respectively, that a face supplies, with the opacity and luminosity, respectively, that the last processed face supplies. Also, $\Delta d_i \leftarrow (D_{i+1} - D_i) \times \Delta z_i$; and $\Delta l_i \leftarrow (L_{i+1} - L_i) \times \Delta z_i$.

The total transparency of a cell is given by:

$$\tilde{t}_i \leftarrow \begin{cases} 1 - \bar{d}_i; \text{ or} \\ 1 - \bar{d}_i + \frac{1}{2} \times \bar{d}_i \times \bar{d}_i; \end{cases}$$

where the latter approximation is derived from a truncated Taylor series.

The total brightness, taking into account opacity, is given by:

$$\tilde{B}_i \leftarrow \begin{cases} \bar{l}_i; \text{ or} \\ \bar{l}_i \times \left(1 - \frac{1}{2} \times \bar{d}_i\right); \text{ or} \\ \bar{l}_i \times \left(1 - \frac{1}{2} \times \bar{d}_i\right) + \frac{1}{12} \times (\bar{l}_i \times \Delta d_i - \bar{d}_i \times \Delta l_i); \end{cases}$$

where the latter approximation is also derived from a truncated Taylor series.

As was stated, the computation of the brightness may proceed from front to back, in which case for each segment $\lambda$ and $\tau$ are updated by $$\lambda \leftarrow \lambda + \tau \times \tilde{B}_i$$

$$\tau \leftarrow \tau \times \tilde{t}_i,$$

or the computation may proceed from back to front, in which case only $\lambda$ is needed:

$$\lambda \leftarrow \lambda \times \tilde{t}_i + \tilde{B}_i.$$

While the front-to-back computation may appear to require more processing time, it has the advantage that the processing can be stopped when the accumulated transparency reaches a small enough value that further contributions are inconsequential.

Figure 6:
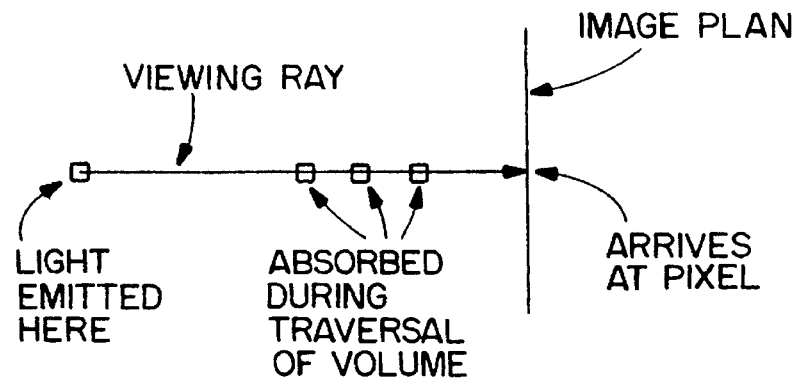
FIGS. 6 and 7 depict a ray tracing technique of the prior art.
Figure 7:
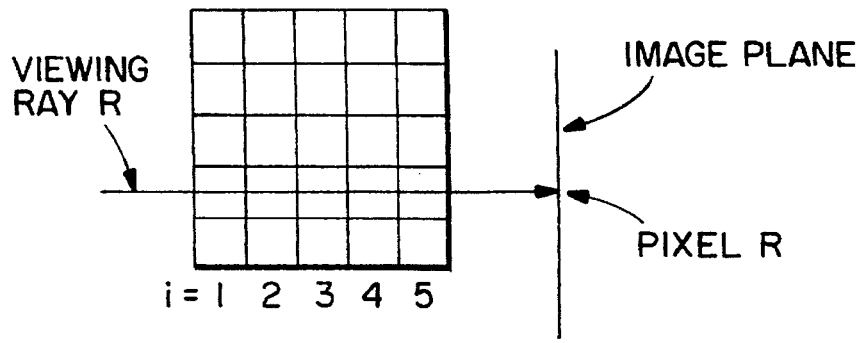

As indicated in FIGS. 6 and 7, in relation to the regular grid compositing method of the prior art, a volume rendering computation requires accumulating, along the viewing ray that corresponds to each pixel, the light scattered from each piece of the volume that is attenuated by passage through the volume between the light emitting portion and the viewer. Regular grid volume rendering is easily accomplished by "compositing" successive layers of the volume.

By example, let $L_r$ be the amount of light arriving at pixel r along the viewing ray associated with that pixel, and let $l_{r,i}$ and $o_{r,i}$ represent, respectively, the luminosity and the opacity of the voxel where ray r intersects slice i.

Figure 8:
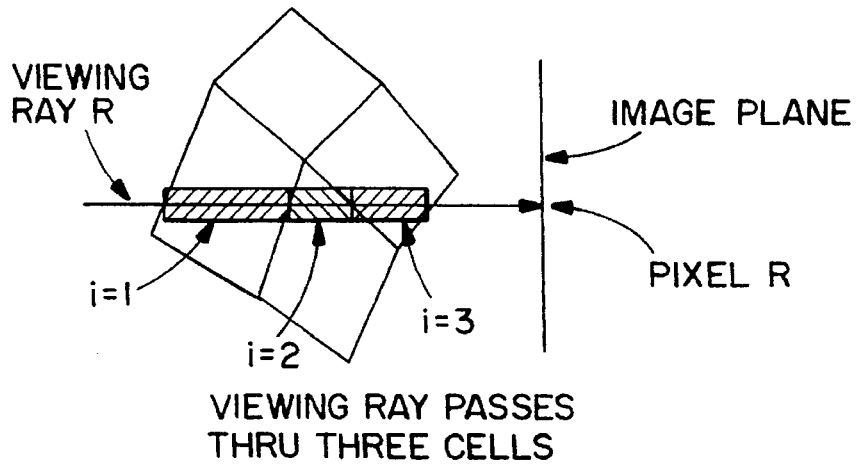
FIG. 8 depicts a viewing ray (r) passing through a plurality of irregular, non-rectangular, grid cells.
Figure 9:
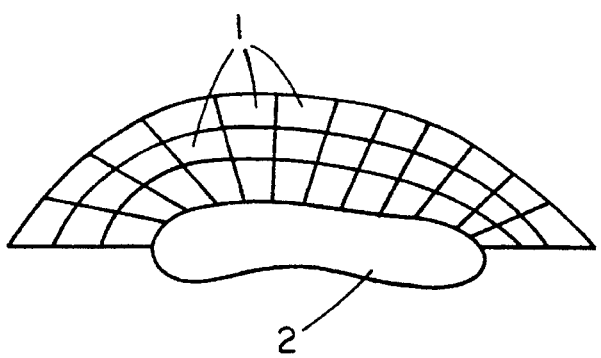
FIG. 9 is a diagram that illustrates an irregular grid, of the type processed by the invention, that is applied to a surface of a wing for modelling an airflow pattern.

The well-known compositing algorithm for regular-grid volume rendering can be summarized as computing all the $L_r$ by:

for each viewing ray r
        $L_r \leftarrow 0$
        for each slice i of volume
            for each voxel v in the slice
                compute viewing ray r that intersects v
                compute $l_{r,i}$ and $o_{r,i}$
                $L_r \leftarrow L_r \times (1 - o_{r,i}) + l_{r,i}$ However, as illustrated in FIG. 8 irregular grid volumetric data is typically represented as a three-dimensional mesh of space-filling polyhedra, or cells. Data values are known at the vertices of each cell, and can be interpolated from these vertex values to give data values throughout the volume of the cell. In the ray-tracing approach, volume rendering is accomplished by stepping along each ray from cell to cell, accumulating the light emitted by the volume as the ray passes through the cell, and attenuating the already accumulated light.

By example, let $L_r$ be the amount of light arriving at pixel r along the viewing ray associated with that pixel, and let $l_{r,i}$ and $o_{r,i}$ represent respectively the luminosity and the opacity of the ith cell of the mesh that ray r intersects.

The known ray-tracing algorithm for irregular-grid volume rendering considers each ray r in turn and computes $L_r$ for that ray by:

For each viewing ray r
  $L_r \leftarrow 0$
  sort cells that ray r intersects
  for each cell i that ray r intersects
    compute $o_{r,i}$ and $L_{r,i}$ of cell i
    $L_r \leftarrow L_r \times (1-O_{r,i})+l_{r,i}$.

In contradistinction, the object-based approach that is a feature of the invention proceeds by computing $L_r$ by rearranging the above computation so that the outermost loops consider each object in turn (hence object-based) in accordance with:

sort cell faces
for each viewing ray r
  $L_r \leftarrow 0$
  for each cell face i
    for each viewing ray r that intersects
    face i
      compute $o_{r,i}$ and $l_{r,i}$ of the cell
      behind face i
      $L_r \leftarrow L_r \times (1-o_{r,i})+l_{r,i}$.

One significant advantage of the object-based technique over the ray-tracing technique is that the computation of the intersection between the rays and the cell faces may be rapidly accomplished. This is because each cell face is examined in turn and all ray intersections with the face are computed together, allowing for some portion of the intersection computation, such as a set up portion, to be shared between rays intersecting the same cell. A second advantage is that the general object-based approach is similar in some respects to the approach used in modern high-performance graphics systems for drawing conventional surface-based models, allowing this volume rendering approach to be more easily and completely integrated into such systems. For example, the ray-cell intersection computation may be accomplished in the same manner as that used for traditional surface rendering. The face-based orientation of the algorithm allows opaque and translucent surfaces, as well as volumes, all to be rendered together in the same image.

Referring to FIG. 5 there is illustrated a face (F) of a tetrahedral cell having vertices $V_1$, $V_2$, and $V_3$. Associated with each vertex are a number of parameters including a depth (z) from the viewplane, RGB color information corresponding to the luminosity, and a value corresponding to the opacity (Op). Between vertices the data values are determined through a linear interpolation technique.

Figure 2:
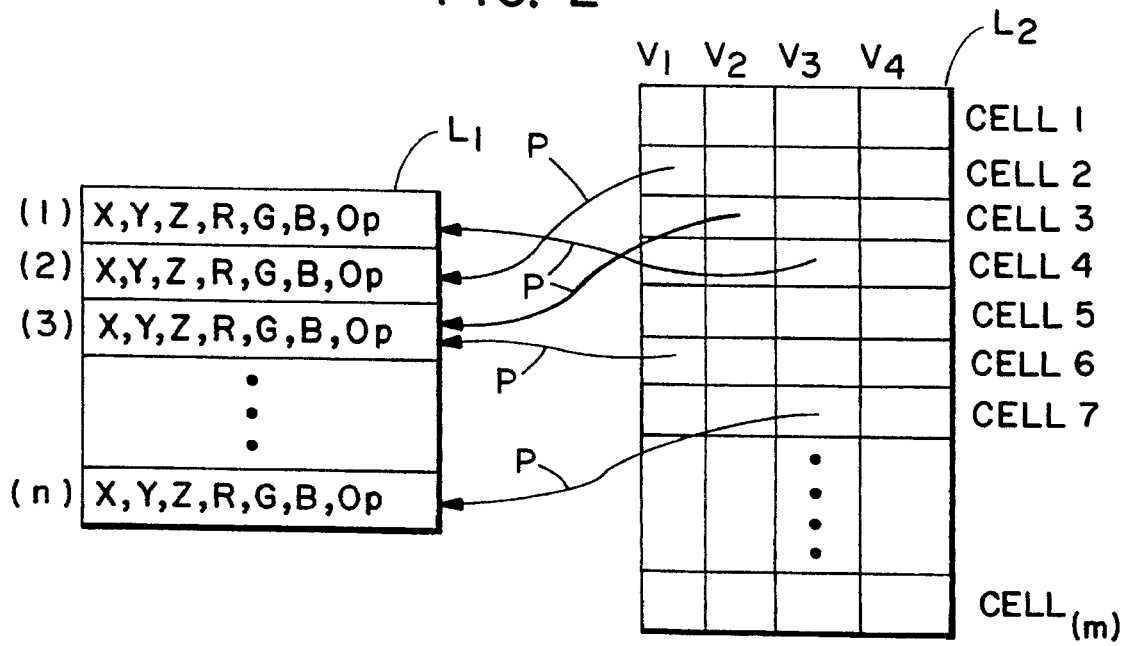
FIG. 2 shows in greater detail the relationship of a point list and a vertex list that are maintained in the memory of the system of FIG. 1.

Referring to FIGS. 2 and 3 there is illustrated in greater detail the organization of the data structures, or lists L1, L2, and L3. In FIG. 2 it is seen that the list L1 stores a plurality (1–n) of points corresponding to vertices of the faces of the grid cells. Each entry includes x, y, z positional data, relative to the viewplane, RGB color information (luminosity) and the associated opacity (Op). L2 is a list of elements that specify the four vertices ($V_1$–$V_4$) for each tetrahedral cell (1–m). It should be realized that for other cell geometries more than four vertices may be required. Each of the four vertex entries for a given cell stores a vertex identifier and a pointer to one of the entries of L1. These pointers are indicated schematically by the arrows designated P in FIG. 2. As can be seen, some of the points in L1 may be referenced by more than one vertex in L2, that is, certain of the vertices may have identical positional, luminosity and opacity values. By this technique, the position, luminosity (RGB), and opacity of each cell vertex is defined and represented. It is noted that in a conventional regular grid-based system, wherein all cell axes are orthogonally disposed relative to one another, that the list L2 is not required in that the vertices are implicitly defined.

Referring to FIG. 3 there is shown a portion of the list L3 that is constructed by the algorithm during the process of rendering. By example, for a tetrahedral grid cell having vertices identified by (5, 8, 13, 22) the faces are defined by vertex identifier triplets (5, 8, 13), (5, 13, 22) etc. The faces are ordered in the list L3 by depth (z) from the viewplane. For the front-to-back method of processing the faces, the faces are ordered in L3 from closest to to farthest from the viewplane. For the back-to-front method of processing the faces, the faces are ordered in L3 from farthest from to closest to the viewplane.

Sorting of the faces along the z-dimension may be accomplished by several techniques. For example, sorting of the faces along the z-dimension may be accomplished in accordance with a known technique that uses a simple ordering by the centroid of each polygon, as described by F. C. Crow at page 12 of "A More Flexible Image Generation Environment", Computer Graphics, Vol. 16, No. 3, pps. 9–18 (July 1982).

Also by example, the faces may be sorted according to z-value based on the average of the z-values of the vertices of the face.

Further by example, the faces may be sorted according to z-value based on the z-value of an arbitrary one of the vertices of the face. This may result in an inaccuracy because occasionally faces can be mis-sorted by these methods. However, this inaccuracy has generally been found to be negligible because it is infrequent, and because mathematical analysis of the methods shows that the mis-sorting approximately cancels out. In other words, the effect of mis-sorting is negligible.

For example, let A, B, C, and D be the intersections of four successive sorted faces with a viewing ray. The correct opacity calculation for this pixel effectively adds the contribution of segment AB, the segment BC, then segment CD, because the faces are processed in the order A, B, C, and then D. However, if faces B and C are sorted in the wrong order then the opacity calculation for this pixel effectively processes segment AC, then segment CB (with a negative delta z), and then segment BD. But the negative delta z for segment CB causes the calculation to approximately "undo" the BC portion of segment AC, making the calculation effectively approximately equal to processing segment AB followed by segment segment BD. This is approximately equal to processing segment AB followed by segments BC and CD.

During operation, the processor 14 accesses the faces in L3 and processes them sequentially in accordance with the method described above to treat all rays that intersect the face. While processing the faces the processor 14 constructs a displayable image in the image buffer IB, the displayable image eventually being provided to the frame buffer 18 for display upon the display 20.

Although described in the context of a color display system it should be realized that the teaching of the invention also relates to black and white display systems. Also, it is within the scope of the invention to associate a separate opacity with each color for simulating the effect of preferentially attenuated light. Furthermore, the system embodiment disclosed in FIG. 1 is but one suitable embodiment for practicing the method of the invention.

Thus, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. A method to be carried out by a computer system for rendering data for display, the data representing a model space that includes at least one translucent solid to be volume rendered, comprising the steps of:

associating individual points in the model space with individual vertices of an irregular grid cell enclosed by faces, each of the vertices of each of a plurality of the grid cells having an associated luminosity value and an associated opacity value;

ordering faces of the grid cells in accordance with their depth from a viewing plane; and processing, in turn, individual ones of the ordered faces of the grid cells for determining, for all viewing rays that project onto pixels on the viewing plane and that intersect the face being processed, an amount of light arriving at the pixel, the amount of light being a function of both the associated luminosity value and the associated opacity value of a grid cell that lies behind a processed face through which the ray passes, the associated luminosity value and the associated opacity value being determined by interpolation between the vertices of the grid cell that lies behind the face being processed, and through which the viewing ray passes, wherein the amount of light arriving at a pixel for a given viewing ray is a function of both the luminosity and the opacity within the volume of each grid cell through which the viewing ray passes.

2. A method as set forth in claim 1 wherein the step of associating includes a step of determining an x, y, and z coordinate of a point relative to the viewing plane.

3. A method as set forth in claim 1 wherein the step of associating includes a step of expressing the luminosity in terms of a plurality of colors.

4. A method as set forth in claim 1 wherein the step of processing is accomplished by processing the faces in order of increasing depth from the viewing plane.

5. A method as set forth in claim 1 wherein the step of processing is accomplished by processing the faces in order of decreasing depth from the viewing plane.

6. Apparatus for rendering data for display, the data representing a model space that includes at least one translucent solid to be volume rendered, comprising:

means for associating individual points in the model space with individual vertices of an irregular grid cell enclosed by faces, each of the vertices of each of a plurality of the grid cells being stored within storage means and having an associated luminosity value and an associated opacity value;

means, coupled to said storage means, for ordering faces of the grid cells in accordance with their depth from a viewing plane; and means for processing, in turn, individual ones of the ordered faces of the grid cells for determining, for all viewing rays that project onto pixels on the viewing plane and that intersect the face being processed, an amount of light arriving at the pixel, the amount of light being a function of both the associated luminosity value and the associated opacity value of a grid cell that lies behind a processed face through which the viewing ray passes, the associated luminosity value and the associated opacity value being determined by interpolation between the vertices of the grid cell that lies behind the face being processed, and through which the viewing ray passes, wherein the amount of light arriving at a pixel for a given viewing ray is a function of both the luminosity and the opacity within the volume of each grid cell through which the viewing ray passes.

7. Apparatus as set forth in claim 6 wherein the means for associating includes means for determining an x, y and z coordinate of a point relative to the viewing plane.

8. Apparatus as set forth in claim 6 wherein the means for associating includes means for expressing the luminosity in terms of a plurality of colors.

9. Apparatus as set forth in claim 8 and further comprising means, coupled to the expressing means, for displaying the colors.

10. Apparatus as set forth in claim 6 wherein the means for processing processes the faces in order of increasing depth from the viewing plane.

11. Apparatus as set forth in claim 6 wherein the means for processing processes the faces in order of decreasing depth from the viewing plane.

12. A method to be carried out by a computer system for rendering data for display, the data representiing a model space, comprising the steps of:

associating individual points in the model space with individual vertices of an irregular grid cell enclosed by faces, each of the vertices of each of a plurality of the grid cells having an associated luminosity value and an associated opacity value;

ordering faces of the grid cells by depth from a viewing plane; and processing, in turn, individual ones of the ordered faces of the grid cells for determining, for all viewing rays that project onto pixels on the viewing plane and that intersect the face being processed, an amount of light arriving at the pixel, the amount of light (L) being a function of both the associated luminosity value (lv) and the associated opacity value (ov) of a grid cell that lies behind a processed face through which the viewing ray passes, the associated luminosity value and the associated opacity value being determined by interpolation between the vertices of the grid cell that lies behind the face being processed, and through which the viewing ray passes, wherein $$L \leftarrow L \times (1-ov) + lv;$$ and wherein the step of processing includes a step of estimating a total transparency ($t_i$) of a grid cell in accordance with the expression $$\tilde{t}_i \leftarrow 1 - \bar{d}_i + \tfrac{1}{2} \times \bar{d}_i \times \bar{d}_i;$$

where $d_i$ is an average opacity.

13. A method as set forth in claim 12 wherein the step of processing includes a step of estimating a total brightness $\tilde{B}_i$ of a grid cell in accordance with the expression $$\bar{l}_i \times \left( 1 - \tfrac{1}{2} \times \bar{d}_i \right) + \tfrac{1}{12} \times (\bar{l}_i \times \Delta d_i - \bar{d}_i \times \Delta l_i)$$

where $\bar{d}_i$ is an average opacity and where $\bar{l}_i$ is an average luminosity.

14. A method as set forth in claim 12 wherein $\lambda$ is an accumulated light at a pixel, where $\tau$ is an accumulated transparency of processed grid cells, where the faces are ordered from closest to furthest from the viewing plane, and wherein $\lambda$ is updated in accordance with $$\lambda \leftarrow \lambda + \tau \times \tilde{B}_i;$$

and where $\tau$ is updated in accordance with $$\tau \leftarrow \tau \times \tilde{t}_i;$$

where $\tilde{B}_i$ is an estimated brightness of a grid cell and where $\tilde{\tau}_i$ is an estimated total transparency of the grid cell.

15. A method as set forth in claim 12 wherein $\lambda$ is an accumulated light at a pixel, wherein the faces are ordered from furthest to closest to the viewing plane, and wherein $\lambda$ is updated in accordance with $$\lambda \leftarrow \lambda \times \tilde{t}_i + \tilde{B}_i,$$

where $\tilde{B}_i$ is an estimated brightness of a grid cell and where $\tilde{\tau}_i$ is an estimated total transparency of the grid cell.

16. A method as set forth in claim 12 wherein the step of associating includes the steps of:

maintaining a first list having entries including a three-dimensional position, a luminosity, and an opacity of points corresponding to vertices of the grid cells;

maintaining a second list having entries including an identifier for each vertex of each grid cell; and establishing a pointer between each entry in the second list and an entry of the first list for specifying, for each vertex identifier, the position, luminosity and opacity of each vertex.

* * * * *